July 8, 1969 W. R. VAN DER VEER 3,454,048
AUTOMATIC IRRIGATION HYDRANT
Filed Jan. 18, 1967 Sheet 1 of 2
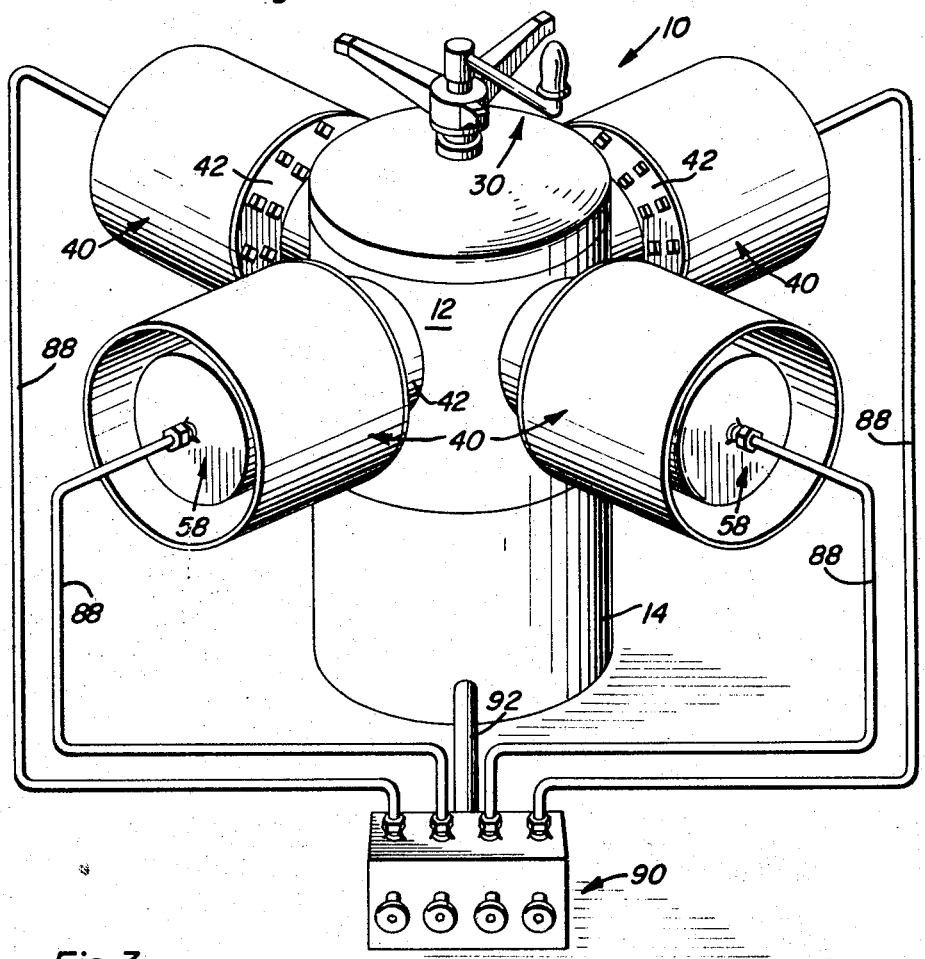
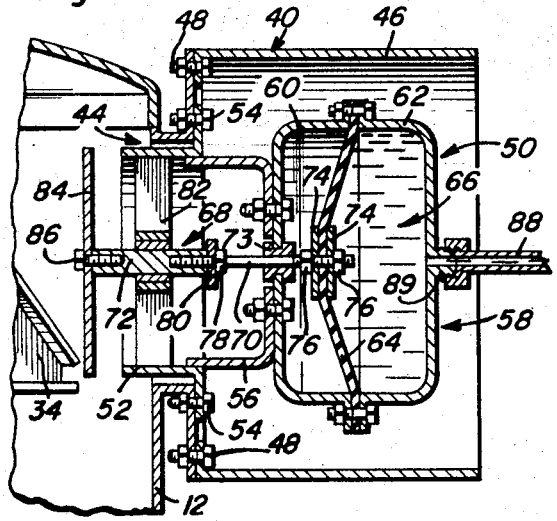
William R. Van der Veer
INVENTOR.

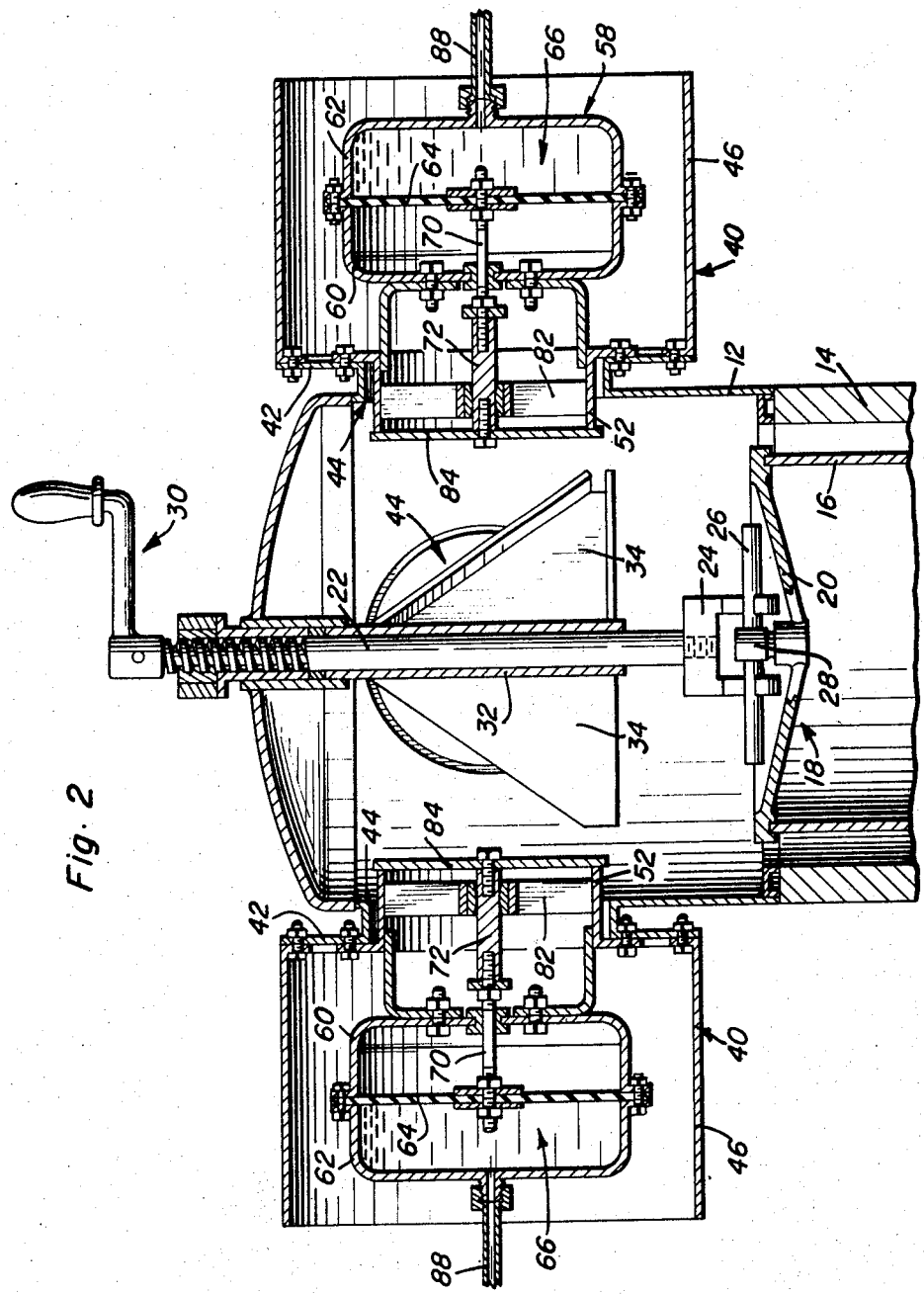

United States Patent Office 3,454,048
Patented July 8, 1969

3,454,048
AUTOMATIC IRRIGATION HYDRANT
William R. Van der Veer, San Antonio, Tex., assignor, by mesne assignments, to William B. Wilson, Iraan, Tex.
Filed Jan. 18, 1967, Ser. No. 610,149
Int. Cl. E03b *9/04;* F16k *31/145*
U.S. Cl. 137—625.11                    7 Claims

ABSTRACT OF THE DISCLOSURE

An automatic irrigation hydrant having side outlets provided with valve inserts utilizing diaphragm type actuators operated by a hydraulic means deriving its input from the main supply of water to the hydrant.

---

The present invention relates to a portable automatic irrigation hydrant particularly adapted to be utilized in conjunction with high volume flood type irrigation systems. More particularly, the present invention relates to the provision of an automatic irrigation hydrant having a plurality of valved branch outlets wherein power necessary for the operation of the valves is derived from the main supply of water to the hydrant.

Irrigation hydrants of the general class disclosed herein have been proposed heretofore. However, such prior art hydrants possess a number of inherent disadvantages. The primary disadvantage associated with such automatic irrigation hydrants is that they generally require an external source of power, i.e., electrical power, for the actuation of their associated outlet valves. In addition, many automatic irrigation hydrants proposed heretofore are not readily adaptable to be utilized in conjunction with a plurality of similar devices so as to sequentially irrigate a section of land in a fully automatic manner. Furthermore, a number of the prior art devices do not lend themselves to the actuation of individual branch outlet valves for varying intervals of time such as may be desirable when applying a disproportionate amount of irrigating water to various portions of land surrounding the hydrant.

It is therefore an object of the present invention to provide a novel construction for an irrigation hydrant so as to facilitate the completely automatic operation of the hydrant.

Another object of the present invention is to provide a portable automatic irrigation hydrant which may be connected to high volume flood type irrigation systems in lieu of the conventionally used manually operated elbow type of outlet fitting so as to permit the automatic irrigation of a plurality of areas surrounding the automatic hydrant.

Still another object of the present invention is to provide an automatic irrigation hydrant having a plurality of valved branch outlets provided with valve inserts utilizing diaphragm type actuators operated, through a hydraulic timer means, from the main supply of water to the hydrant.

Still another object of the present invention is to provide a novel construction for an automatic irrigation hydrant which may be utilized with a plurality of other similar hydrants to sequentially and automatically irrigate large land areas without having to resort to an auxiliary source of power inasmuch as the power necessary for operation of the automatic hydrants is derived from the main supply of water to the hydrants.

Still a further object of the present invention is to provide an automatic irrigation hydrant which may be utilized on irrigation systems having low as well as high supply pressures.

Still a further object of the present invention is to provide a novel construction for an automatic irrigation hydrant having valved branched outlets provided with hydraulically actuated valve inserts adapted to be operated in a remote manner by a hydraulic pilot valve system.

Still a further object of the present inventinon is to provide a novel construction for an automatic irrigation hydrant which is adapted to be positively controlled to selectively vary the interval of time during which the individual branch outlets of the hydrant are open so as to selectively control the amount of irrigating water being supplied to a given area or areas of land adjacent to the irrigation hydrant.

Still a further object of the present invention is to provide a novel construction for an irrigation hydrant of the aforementioned type wherein the hydraulically actuated valves controlling the flow of irrigating water from the outlets of the hydrant are self-seating and thus normally closed by the pressure of the main supply of water to the hydrant.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an exemplary embodiment of an automatic irrigation hydrant constructed in accordance with the principles of the present invention and further schematically showing a hydraulic interval timer adapted to automatically actuate the several outlet valves of the hydrant;

FIGURE 2 is an enlarged transverse vertical cross-sectional view of the automatic hydrant of FIGURE 1 showing additional details of the inlet and outlet valve means of the automatic hydrant; and FIGURE 3 is a fragmentary transverse vertical cross-sectional view of an outlet valve insert assembly of the hydrant of FIGURE 1 further showing the manner in which the valve means is actuated to permit discharge of irrigation water from the automatic hydrant in response to hydraulic pressurization of the outlet valve assembly by means of a hydraulic interval timer, or the like, such as schematically shown in FIGURE 1.

Referring now to the drawings and FIGURE 1 in particular it will be seen that the exemplary embodiment of an automatic irrigation hydrant 10 illustrated therein includes a generally cylindrical main body 12, which as seen in FIGURE 2 is removably placed or supported on a section of concrete pipe 14 comprising an outlet of a subterranean irrigation water distributing system or the like so as to be in overlying relation to a main supply line 16 supplying water under pressure to the automatic irrigation hydrant 10. The main supply line 16 is provided with a conventional valve indicated generally at 18 which includes a valve plate 20 normally resting in flow controlling engagement with the upper end of the main supply line 16. The valve plate 20 is manually operated by a threadably received shaft 22 having a bifurcated portion 24 at the lower extremity thereof which is adapted to releasably engage a crossbar 26 carried by an upstanding centrally disposed apertured post 28 integral with the plate 20. The threaded shaft 22 is further provided with a handle operating means indicated generally at 30. The threaded shaft 22 is rotatably journaled in a tube 32 rigidly secured with respect to the interior of the main body 12 of the hydrant 10 by a plurality of circumferentially disposed brackets 34 which are positioned so as not to occlude the flow of water upwardly from the main supply pipe 16 into the interior of the main hydrant body 12. Inasmuch as the main supply line valve 18 is of conventional construction and well known in the art, a further description thereof is deemed to be unnecessary.

In the exemplary embodiment illustrated the main hydrant body 12 is provided with four circumferentially disposed horizontally projecting valve insert assemblies indicated generally at 40 removably secured to side outlets 42 defining four circumferentially disposed outlet apertures as indicated at 44. An annular guard ring 46 is removably secured to an upstanding flange portion of each of the outlets 42 by means of suitable fasteners such as bolts 48 so as to afford protection for hydraulically actuated valve inserts indicated generally at 50 which include valve seat and ring assemblies 52 releasably secured in sealing relation to the vertically disposed flange portion of the side outlets 42 by means of suitable fasteners such as bolts 54. The valve seat and ring assemblies 52 include generally U-shaped actuator mounting bases 56 to which are removably secured diaphragm type actuator means 58 including a pair of generally hemispherical chamber portions 60 and 62 which clampingly and sealingly engage resilient actuator diaphragms 64 so as to create expansible chambers indicated generally at 66.

The resilient diaphragm 64 has centrally secured thereto a valve plate operator rod means 68 which includes a rod 70 externally threaded at both ends and a nonthreaded rod 72 bored and tapped at both ends. The rod 70 clampingly and sealingly engages the resilient diaphragm 64 by virtue of the fact that it passes through a suitable aperture therein and is secured thereto by a pair of suitable washers 74 and associated locknuts 76. The opposite end of the rod 70 is received in one end of the rod 72 and locked therein by a threadedly received nut 78 which also rigidly secures a stop member 80 which assists in limiting the travel of the shaft 72 by virtue of the fact that in extreme travel of the shaft 72 it comes to bear against a bearing support spider 82 adapted to guidingly support the shaft 72. The rod 70 is sealingly but slidably received in a seal grommet 73 carried by the actuator portion 60 so as to prevent pressurization of the interior of the portion 60. Adjacent the inwardly disposed end of the shaft 72 an insert valve plate 84 is secured thereto by a threadably received bolt 86 and as seen best in FIGURE 2 the insert valve plate 84 normally closes off the outlet valve port defined by the valve seat and ring 52. Each of the diaphragm type actuators 58 is provided with an inlet conduit 88 secured to a complementary threaded boss on the hemispherical portion 62 which conduit 88 is in communication with the expansible chamber 66.

As seen best in FIGURE 1, the inlet conduits 88 are preferably operatively connected to a hydraulic interval timer means indicated generally at 90 which derives its input from a branch flow conduit 92 in communication with the interior of the main supply line 16. The hydraulic interval timer means 90 is of a conventional type wherein water under line pressure entering the timer 90 through the branch conduit 92 is sequentially directed through the conduits 88 to the diaphragm actuator means 58 of the insert valve means 50 so as to effect opening of the valve plate 84 by pressurization of the chamber 66 sufficiently to urge the diaphragm from the position shown in FIGURE 2 to that shown in FIGURE 3 whereby water entering the interior of the hydrant body 12 from the main supply line 16 through the valve means 18 will be permitted to flow outwardly through the valve port defined by the ring member 52 and thence outwardly onto the ground through the guard ring 46. The hydraulic interval timer means 90 after a predetermined period of time will permit the water to drain from chamber 66 so as to allow the pressure of the water within the interior of the hydrant 12 to urge the valve plate 84 to the closed position, shown in FIGURE 1, wherein it is seated against the valve ring 52. It is possible to achieve this operation of the insert valve means 50 using the same pressure as that of the water within the main supply line 16 because the area of the diaphragm 64 is sufficiently greater than the area of the valve plate 84 so as to result in a net or positive opening force.

It will thus be appreciated that an automatic irrigation hydrant constructed in accordance with the principles of the present invention provides a completely automatic means of servicing the areas to be irrigated without the necessity of having to rely on an external source of power, other than power derived from the irrigation water in the main supply line feeding the hydrant. It will be further appreciated that an automatic irrigation hydrant such as the exemplary embodiment 10 possesses a high degree of portability in that the hydrant 10 may be attached quickly to a standard irrigation outlet, such as the outlet 14, that is usually encountered on irrigation systems so as to provide a capability of servicing a multiplicity of areas to be irrigated that are adjacent to the irrigation outlet 14 by providing a fully automatic means of watering each of the areas on an individual, sequential basis.

What is claimed as new is as follows:

1. An automatic irrigation hydrant for an irrigation system including a water outlet provided with a manual valve provided with a valve operator, said automatic irrigation hydrant comprising a main hydrant body including branch outlets and a main water supply inlet in communication with the water outlet and opening into said main body, said branch outlets radiating outwardly from said main body, a plurality of hydraulically actuated insert valves in the main body, each valve being operatively connected to a branch outlet to control flow therethrough, said insert valves including hydraulic actuating means for sequentially operating said insert valves for sequentially opening said insert valves against the pressure of the water in said main body so as to permit water from the water outlet to flow upwardly through said main body and outwardly through said insert valve means in said branch outlet.

2. An automatic irrigation hydrant for an irrigation system including a water outlet provided with a manual valve provided with a valve operator, said automatic irrigation hydrant comprising a main hydrant body including branch outlets and a main water supply inlet in communication with the water outlet and opening into said main body, said branch outlets radiating outwardly from said main body, a plurality of hydraulically actuated insert valves in the main body, each valve being operatively connected to a branch outlet to control flow therethrough, said insert valves including hydraulic actuating means for sequentially operating said insert valves for sequentially opening said insert valves against the pressure of the water in said main body so as to permit water from the water outlet to flow upwardly through said main body and outwardly through said insert valve means in said branch outlet, and hydraulic interval timer means deriving its input from said main supply line operatively connected to said valve actuating means for controlling the opening of said insert valve means sequentially and for a predetermined time by subjecting said insert valve means to the pressure of the water in said main supply line.

3. An automatic irrigation hydrant for an irrigation system including a water outlet provided with a manual valve provided with a valve operator, said automatic irrigation hydrant comprising a main hydrant body in communication with said water outlet through said manual valve, said main hydrant body including branch outlets radiating outwardly from said main hydrant body, a plurality of hydraulically actuated insert valves in the main hydrant body, each hydraulically actuated valve being operatively connected to a branch outlet to control flow therethrough, said connection of said hydraulically actuated insert valve to said branch outlet comprising a valve seat and ring assembly mounted within each of said branch outlets, hydraulic actuating means carried by said valve seat and ring assembly for selectively opening said insert valves to permit the flow of irrigation water outwardly from said main hydrant body, said hydraulic actuating means including a diaphragm expansible chamber actuator including an actuator diaphragm, insert valve plate means operatively carried by said actuator diaphragm and adapted to seat against said valve seat and ring assembly in flow blocking relation thereto, said insert valve plate being adapted to be opened by pressurization of said diaphragm expansible chamber actuator, and hydraulic interval timer means operatively connected with said diaphragm expansible chamber actuating means for controlling the opening of said valve plate in response to the sequential, timed pressurization of said diaphragm expansible chamber actuator by the main supply line pressure being directed thereto in a controlled manner by said hydraulic interval timer.

4. The combination of claim 1 wherein said automatic irrigation hydrant includes four branch outlets which radiate outwardly from said water outlet in a manner so as to facilitate the irrigation of four distinct irrigation zones completely circumscribing said hydrant and each of said branch outlets is provided with a valve insert guard means fixed to said main body and concentrically disposed about said insert valve means.

5. The combination of claim 2 wherein said automatic irrigation hydrant includes four branch outlets which radiate outwardly from said water outlet in a manner so as to facilitate the irrigation of four distinct irrigation zones completely circumscribing said hydrant and each of said branch outlets is provided with a valve insert guard means fixed to said main body and concentrically disposed about said insert valve means.

6. The combination of claim 3 wherein said automatic irrigation hydrant includes four branch outlets which radiate outwardly from said water outlet in a manner so as to facilitate the irrigation of four distinct irrigation zones completely circumscribing said hydrant and each of said branch outlets is provided with a valve insert guard means fixed to said main body and concentrically disposed about said insert valve means.

7. The combination of claim 3 wherein said valve seat and ring assembly is of substantially the same diameter as said branch outlet so as to facilitate low back-pressure flow of water outwardly from said hydrant when said valve plate is moved into the open position by pressurization of said diaphragm expansible chamber actuator.

References Cited

UNITED STATES PATENTS

| | | | |
|---|---|---|---|
| 2,085,916 | 7/1937 | Marra | 137—627 XR |
| 2,320,011 | 5/1943 | Reynolds | 137—627 XR |
| 2,979,082 | 4/1961 | Neves | 137—625.11 |
| 3,000,398 | 9/1961 | Link | 137—625.11 XR |
| 3,073,490 | 1/1963 | Dahl et al. | 251—331 XR |
| 3,100,502 | 8/1963 | Ford et al. | 137—510 XR |
| 3,141,448 | 7/1964 | Candelise | 137—625.11 XR |
| 3,319,654 | 5/1967 | Faldi | 137—624.18 |
| 3,348,566 | 10/1967 | Varis | 137—510 |
| 3,399,698 | 9/1968 | Bentley | 137—625.11 XR |

DONALD E. WATKINS, Primary Examiner.

U.S. Cl. X.R.

137—624.14, 624.18; 239—66